UNITED STATES PATENT OFFICE.

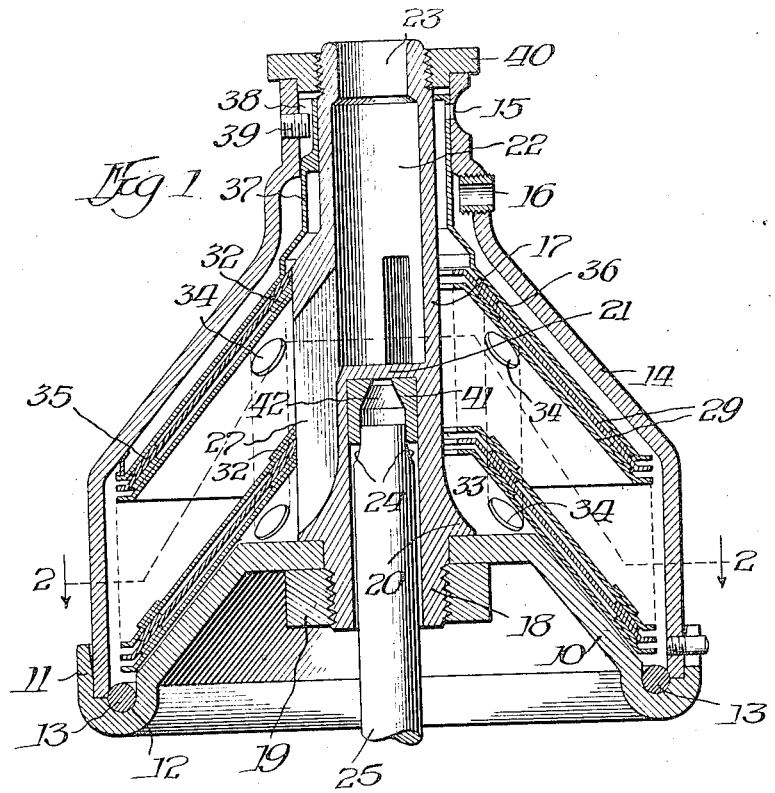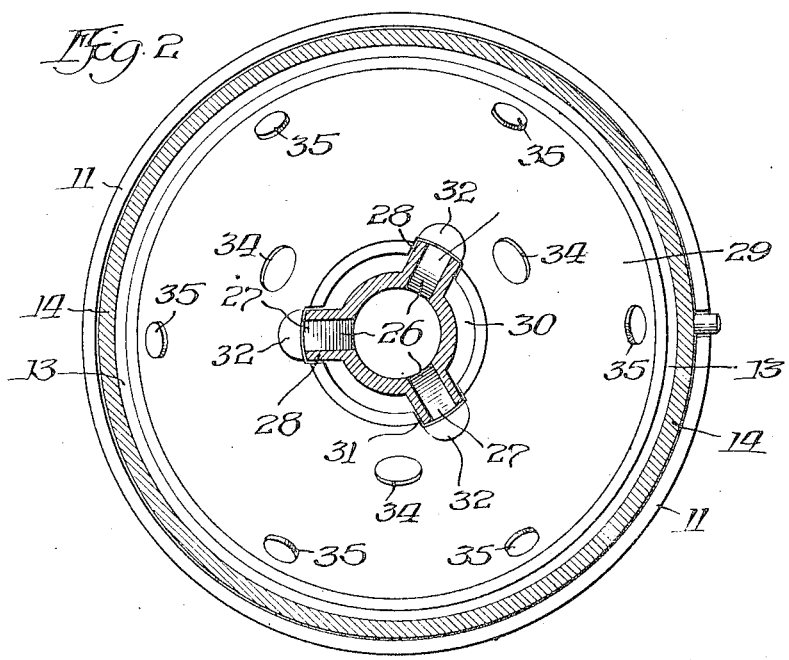

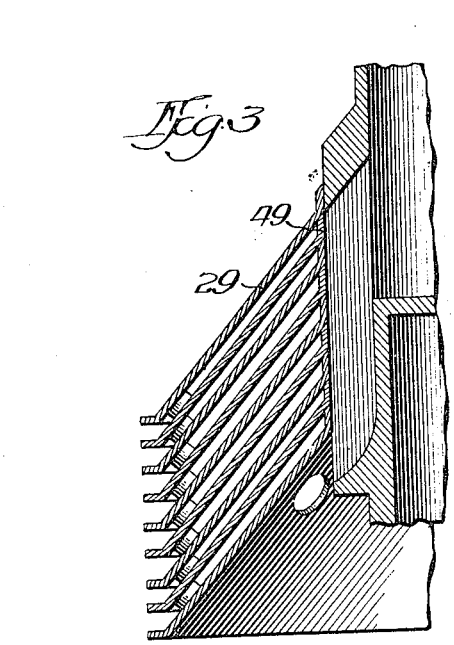
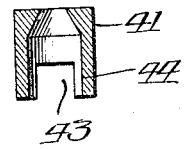
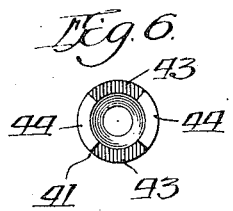
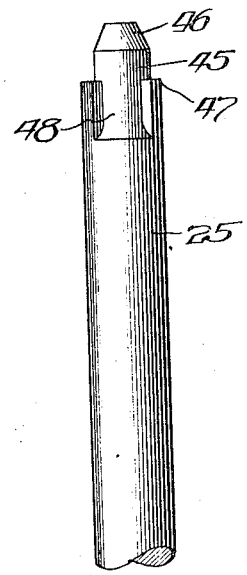
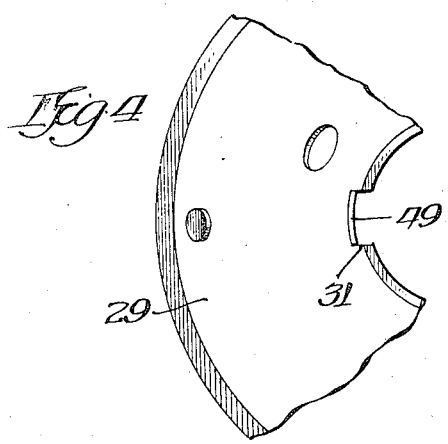

CARL OSCAR ANDERSON, OF SPRINGFIELD, ILLINOIS, ASSIGNOR TO MONTGOMERY WARD & CO., INC., OF CHICAGO, ILLINOIS, A CORPORATION OF NEW YORK.

CREAM-SEPARATOR BOWL.

1,322,745.

Specification of Letters Patent. Patented Nov. 25, 1919.

Application filed April 13, 1918. Serial No. 228,301.

*To all whom it may concern:*

Be it known that I, CARL OSCAR ANDERSON, a citizen of the United States, residing at Springfield, in the county of Sangamon and State of Illinois, have invented certain new and useful Improvements in Cream-Separator Bowls, of which the following is a specification.

This invention relates to improvements in centrifugal machines adapted for the mechanical separation of cream, and is more particularly concerned with the separator bowl thereof.

The main and primary object of the invention is to provide a novel construction of bowl the parts of which are so organized and related as to attain the highest degree of separation, and also by which proper balancing of the bowl, during its rotation, is assured.

Furthermore, the invention seeks to provide a separator bowl of compact construction, thereby economizing in the space required for the accommodation of the several parts, and thus contributing to the easy running of the bowl as well as promoting the most effective separation of the cream and the blue milk.

A further object of the invention is to simplify the construction of separator bowls by reducing the parts thereof so that liability of derangement and damage is minimized, while access to the several parts for cleansing and repair may be readily had.

The invention also has in contemplation the provision of novel means for connecting the bowl in driving relation to its spindle through the medium of which the bowl may be readily applied to and detached from the spindle.

With these general objects in view, and others that will appear as the nature of the improvements is better understood, the invention consists substantially in the novel construction, combination and arrangement of parts hereinafter fully described, illustrated in the accompanying drawings, and finally pointed out in the appended claims.

It is to be understood, however, that the embodiment of the invention herein disclosed is but one adaptation thereof, and the invention, therefore, is not to be restricted to the form shown and described.

In the accompanying drawings—

Figure 1 is a vertical transverse sectional view of a separator bowl constructed in accordance with the present invention;

Fig. 2 is a horizontal sectional plan view thereof, as on the line 2—2, Fig. 1;

Fig. 3 is a fragmentary vertical transverse sectional view illustrating another form of separating means for spacing apart the liner disks;

Fig. 4 is a plan view of a portion of one of the liner disks embodying the form of separator means disclosed in Fig. 3;

Fig. 5 is a vertical transverse sectional view of the spindle thimble;

Fig. 6 is an inverted plan view thereof;

Fig. 7 is a side elevation of the spindle.

Referring now in detail to the drawings, the numeral 10 designates the base of the hereindescribed bowl, the same being substantially frusto-conical in accordance with the modern practice employed in the construction of centrifugal separators. The base 10 is provided with an upstanding marginal flange 11, adjacent to which is a circumferential groove 12 for receiving the usual packing gasket 13.

Associated with the base 10 is the casing 14, which is also frusto-conical, the same being provided with a cream outlet 15 and a skim milk outlet 16.

Centrally disposed with respect to the base 10 is an inlet tube 17, the lower end of which is reduced in diameter, as at 18, and fits within a central opening formed in the base 10, the extremity 18 being screw threaded for the reception of a fastening nut 19 whereby the inlet tube 17 is held in fixed relation to the base 10. By reducing the lower end of the inlet tube 17 an annular shoulder 20 is formed on the tube 17, which shoulder is fixed upon the elevated portion of the base 10, and thus insures a firm support for the inlet tube when the latter is positioned on the base.

The inlet tube 17 is provided with a horizontal partition 21 at a point substantially midway its upper and lower ends, the interior of the tube 17 above said partition providing a receiving chamber 22 for the whole milk, which chamber 22 has an inlet 23 at its upper end through which the whole milk is introduced to said chamber. Beneath the partition 21 is provided a spindle receiving chamber 24 in which the driving spindle 25 is projected in the usual manner.

At the lower end of the receiving chamber 22 is a plurality of feed ports 26, said ports being positioned adjacent to the partition 21 so that the whole milk may be readily discharged from said chamber 22, and said ports 26 communicate with a plurality of vertical feed channels 27 formed in a plurality of radially extending wings 28 carried by and integral with the inlet tube 17. These feed channels 27 extend from the ports 26 downwardly to the lower end of the feed tube and terminate adjacent to the shoulder 20 thereof. Obviously, as the milk descends through said feed channels from the receiving chamber 22 it will be discharged in radial directions when the same reaches the lower ends of said channels.

Surrounding the inlet tube 17 is a plurality of conical liner disks 29. These disks are centrally perforated to fit about the inlet tube 17 but are slightly spaced therefrom, and thus provide cream channels 30 between the radial wings 28, so that as the cream is separated it will rise upwardly along the sides of the inlet tube between these wings and eventually reach the cream outlet 15. By referring to Fig. 2 it will be noted that the separator disks 29 are provided with a plurality of radial notches 31 which receive the wings 28. This provides guiding means for positioning the liner disks on the inlet tube and likewise prevents rotation of the disks relatively to the latter. It is essential that the outer portions of the feed channels 27 shall be closed in order to guide the whole milk downwardly therethrough for discharge at their lower ends, and to the accomplishment of this each of the liner disks is provided with a plurality of closure buttons 32. In Fig. 1 these buttons are illustrated as separate pieces from the liner disks, and they are secured in place thereon preferably by welding, although other suitable means may be employed for this purpose. The buttons 32 are arranged on the liner disks adjacent to the notches 31 thereof, and said buttons are therefore directly opposite the outer open edges of the feed channels 27. In the assembled relation of the several liner disks it will be evident that the buttons 32 close the spaces therebetween adjacent to the inner edges of the disks and in this combined relation the thicknesses of the liner disks and the buttons 32 present a wall to the outflow of the whole milk through the outer edges of the feed channels 27, thereby preventing the milk passing in any other direction than downwardly through said channels to their lower ends, at which points the discharge of the milk eventually takes place.

It will also be observed that the central portion of the lowermost liner disk 29 is at a point considerably above the elevated portion of the base 10, and likewise considerably above the extreme lower ends of the channels 27. An annular equalizing chamber 33 is thereby formed at the base of the inlet tube for receiving the whole milk as it is discharged from the channels 27, and this equalizing chamber extends continuously around the base of the inlet tube 17 so that the body of milk received thereby is a continuous body encircling the base of the inlet tube.

The liner disks 29 are also provided with a plurality of circulating openings 34 which, in the assembled relation of the disks, are in vertical alinement, and thus provide vertical distributing passages for the milk as it rises from the equalizing chamber 33 and by means of which the milk may enter the spaces between the disks. These circulating openings are arranged preferably in the disks at points between the radial wings 28 of the inlet tube 17. Furthermore, it will be noted that the several disks 29 are provided with spacing buttons 35 as is usual in separator bowl construction in order to maintain the several liner disks spaced apart, and thus permit free passage of the milk therebetween. These spacing buttons 35 may also be welded to the disks 29 as described in connection with the closure buttons 32.

Surmounting the liner disks 29 is a cream cone 36 having the usual neck 37 provided with a vertical centering groove 38 into which a holding screw 39 is projected, whereby to maintain the cream cone in proper position in relation to the liner disks. A fastening nut 40 engages the upper screw threaded end of the inlet tube 17 and serves to clamp the casing 14 onto the base 10 when the bowl structure is assembled.

It has been stated that one of the objects of the present invention is to provide a novel form of connecting means between the driving spindle and the bowl. This includes the thimble 41 provided with a tapered bore 42 and having oppositely disposed notches 43 formed in its lower edges. Depending wings 44 are thus provided at the lower end of the thimble. The spindle 25 is provided with a reduced neck 45 and its upper extremity is tapered, as at 46, in order to fit the tapered bore of the thimble 41. By the formation of the reduced neck 45 on the spindle 25 the latter is provided with a shoulder 47, and the opposite sides of the spindle 25 immediately below said shoulder 47 are cut out to provide notches 48 which receive the depending wings 44 of the thimble 41. The latter is driven tightly into the chamber 24 of the inlet tube 17 and is seated at the upper end of said chamber, or it may be fastened therein in any other suitable manner which will provide such a fixed relation between the thimble and the bowl that the thimble will rotate with the latter. When, therefore, the bowl is applied to the spindle 25 the depending wings 44 will enter the notches 48, becoming seated therein, and the oppositely disposed notches 43 of the thimble will receive that portion of the spindle 25 below the shoulder 45 thereof and between the notches 48 of the spindle. A keyed connection is thus afforded between the bowl and the spindle which will insure rotation of the bowl with the spindle, and likewise a proper balancing of the bowl on the spindle. Furthermore, the construction described enables a ready attachment to and removal from the spindle of the bowl when it is desired to apply the same to or remove it from the spindle.

The operation of the hereindescribed bowl in the separation of the constituent elements of the whole milk will be as follows: The whole milk is introduced into the receiving chamber 22 through the inlet 23. It passes through the ports 26, and by reason of the assembled relation of the liner disks affording a wall to the outer edges of the distributing channels 27, the milk passes downwardly through the latter into the equalizing chamber 33. A continuous body of whole milk is thus accumulated in this equalizing chamber, and when pressure has become sufficiently great therein the whole milk will rise through the distributing openings 34 and pass into the spaces between the liner disks. Under the rotation of the bowl separation will be effected in the usual way, cream passing into the channels 30 and rising along the sides of the inlet tube 17, between the wings 28 thereof, until it reaches the cream outlet 15 where it is discharged into the usual collecting receptacle (not shown). The blue milk is forced outwardly, also in the usual way, and rises upwardly at the outer edges of the liner disks, passing between the casing 14 and the cream cone 36, and is discharged through the skim milk opening 16. In passing downwardly through the distributing channels 27 the whole milk is compelled to take a direct downward course by reason of the closure buttons 32 and the several thicknesses of the liner disks forming a wall at the outer edges of the channels, and in creating the continuous body of milk in the equalizing chamber 33 a better distribution of the milk between the disks is attained. Furthermore, the assemblage of the parts as illustrated and described renders them readily accessible for cleansing purposes, thus assuring sanitary conditions, and also permitting easy repair in the event of damage or injury to any of the parts.

In Fig. 3 is illustrated a slightly modified form of liner disk. In lieu of employing the closure buttons 32 the construction illustrated in Fig. 3, and likewise in Fig. 4, contemplates the formation of an upstanding spacing lip 49 at the inner edges of each of the disks at points adjacent to the notches 31 thereof. These lips 49, therefore, serve the purpose of closing the spaces between the several liner disks and provide the wall for closing the outer edge of the several channels 27.

It has not been deemed necessary to illustrate all of the several liner disks in Fig. 1. The dotted lines extending between these disks typify the disks which are omitted between those illustrated.

I claim:

1. In a separator bowl of the class described including a base, a casing, and means for holding the same in associated relation, the combination with an inlet tube carried by said base and provided with a receiving chamber for the whole milk and ports for passage of the same therefrom, and a plurality of vertically disposed distributing channels in communication with said ports and having their lower ends disposed adjacent to the base of the inlet tube, whereby to conduct the whole milk from said receiving chamber to a point adjacent to the base of the bowl, of a plurality of liner disks surrounding said inlet tube, the lowermost of said disks having its inner edge positioned at a point above the base of the inlet tube, whereby to provide a continuous equalizing chamber thereat into which said distributing channels discharge, and means associated with said liner disks at their inner edges and combining therewith to provide a closure wall for the outer edges of the distributing channels whereby to compel downward passage of the whole milk to the equalizing chamber.

2. In a separator bowl of the class described including a base, a casing, and means for holding the same in associated relation, the combination with an inlet tube carried by said base and provided with a receiving chamber for the whole milk and ports for passage of the same therefrom, and a plurality of vertically disposed distributing channels in communication with said ports and having their lower ends disposed adjacent to the base of the inlet tube, whereby to conduct the whole milk from said receiving chamber to a point adjacent to the base of the bowl, of a plurality of liner disks surrounding said inlet tube, the lowermost of said disks having its inner edge positioned at a point above the base of the inlet tube, whereby to provide a continuous equalizing chamber thereat into which said distributing channels discharge, and spacing elements associated with said liner disks, at their inner edges and combining therewith to provide a closure wall for the outer edges of the distributing channels whereby to compel downward passage of the whole milk to the equalizing chamber.

3. In a separator bowl of the class described including a base, a casing, and means for holding the same in associated relation, the combination with an inlet tube carried by said base and provided with means for conducting whole milk to the interior of the bowl, said means including a plurality of vertical channels, of a plurality of liner disks surrounding the inlet tube, and means associated with said liner disks for closing the outer portions of said channels to force the whole milk downwardly through the latter, an equalizing chamber being provided at the lower end of said channels and between the latter and the liner disks into which the whole milk is discharged from said channels.

4. In a separator bowl of the class described including a base, a casing, and means for holding the same in associated relation, the combination with an inlet tube carried by said base and provided with a receiving chamber for the whole milk, said inlet tube also being provided with radially extending wings having vertically disposed distributing channels formed therein, said receiving chamber having ports for affording communication with said distributing channels, of a plurality of liner disks surrounding said inlet tube and having a plurality of radial notches for receiving said wings, and means associated with said liner disks at points therebetween in opposite relation to the wings of said inlet tube and combining with the disks to provide a closure wall for the outer portions of said channels whereby to compel the whole milk to take a downward course through said channels before distribution into the spaces between the liner disks, an equalizing chamber being formed between said inlet tube and said liner disks into which said milk is discharged by said channels.

5. In a separator bowl of the class described including a base, a casing, and means for holding the same in associated relation, the combination with an inlet tube carried by said base and provided with means for conducting the whole milk to the interior of the bowl, said means including a plurality of vertical channels, of a plurality of liner disks surrounding the inlet tube, the lowermost of said liner disks having its inner edge positioned at a point above the base of the inlet tube to provide a continuous equalizing chamber around the latter, and a plurality of closure elements also associated with said liner disks and positioned thereon at points opposite to the distributing channels of the inlet tube, said closure elements combining with the liner disks to provide a closure wall for the outer portions of the distributing channels, whereby to force the whole milk downwardly into said equalizing chamber.

In testimony whereof I have hereunto signed my name in the presence of two subscribing witnesses.

CARL OSCAR ANDERSON.

Witnesses:
 EDWARD E. DE PREITAS,
 W. A. LYMAN.